United States Patent [19]

Cashler

[11] Patent Number: 5,732,375
[45] Date of Patent: Mar. 24, 1998

[54] METHOD OF INHIBITING OR ALLOWING AIRBAG DEPLOYMENT

[75] Inventor: Robert John Cashler, Kokomo, Ind.

[73] Assignee: Delco Electronics Corp., Kokomo, Ind.

[21] Appl. No.: 566,029

[22] Filed: Dec. 1, 1995

[51] Int. Cl.⁶ .......................... B60R 21/32; G06F 17/40
[52] U.S. Cl. ........................ 701/45; 701/46; 180/273; 280/735
[58] Field of Search ............ 364/424.055, 424.056, 364/424.057, 567, 568; 180/271, 282, 268, 273; 307/15.1; 340/436, 438; 280/735, 730.01, 730.02

[56] References Cited

U.S. PATENT DOCUMENTS

| | | | |
|---|---|---|---|
| 5,010,774 | 4/1991 | Kiko et al. | 73/862.042 |
| 5,161,820 | 11/1992 | Vollmer | 280/730.1 |
| 5,232,243 | 8/1993 | Blackburn et al. | 280/732 |
| 5,384,716 | 1/1995 | Araki et al. | 364/557 |
| 5,454,591 | 10/1995 | Mazur et al. | 280/735 |
| 5,474,327 | 12/1995 | Schousek | 180/268 |
| 5,494,311 | 2/1996 | Blackburn et al. | 280/735 |
| 5,570,301 | 10/1996 | Barrus | 364/559 |
| 5,570,903 | 11/1996 | Meister et al. | 280/735 |
| 5,605,348 | 2/1997 | Blackburn et al. | 280/735 |
| 5,612,876 | 3/1997 | Zeidler et al. | 364/424.055 |

OTHER PUBLICATIONS

Research Disclosure—Jan. 1994 #357—"Method for Sensing Occupant Mass and Position." Disclosed Anonymously.

*Primary Examiner*—Tan Q. Nguyen
*Attorney, Agent, or Firm*—Mark A. Navarre

[57] ABSTRACT

An array of pressure sensors on a vehicle passenger seat senses the presence of an occupant including an infant seat and determines whether the infant seat faces forward or rearward. A microprocessor coupled to the sensors determines whether to allow or inhibit deployment based on the sensor load forces and the pattern of loading. The pattern can identify an infant seat and pattern and loading determine its orientation. Local areas are checked to detect child occupants. Fuzzy logic is used to determine loading and to recognize patterns.

19 Claims, 4 Drawing Sheets

METHOD OF INHIBITING OR ALLOWING AIRBAG DEPLOYMENT

FIELD OF THE INVENTION

This invention relates to occupant restraints for vehicles and particularly to a method using seat sensors to determine seat occupancy for control of airbag deployment.

BACKGROUND OF THE INVENTION

The expanding use of supplemental inflatable restraints (SIRs) or airbags for occupant protection in vehicles increasingly involves equipment for the front outboard passenger seat. The driver side airbag has been deployed whenever an imminent crash is sensed. The position and size of the driver is fairly predictable so that such deployment can advantageously interact with the driver upon a crash. The passenger seat, however, may be occupied by a large or a small occupant including a baby in an infant seat. It can not be assumed that a passenger of any size is at an optimum position (leaning against or near the seat back). An infant seat is normally used in a rear facing position for small babies and in a forward facing position for larger babies and small children. While the forward facing position approximates the preferred position for airbag interaction, the rear facing position places the top portion of the infant seat close to the vehicle dash which houses the airbag. In the latter event, it is desirable to prevent deployment of the airbag.

It has been proposed in U.S. Pat. No. 5,474,327 which will issue Dec. 12, 1995, entitled VEHICLE OCCUPANT RESTRAINT WITH SEAT PRESSURE SENSOR and assigned to the assignee of this invention, to incorporate pressure sensors in the passenger seat and monitor the response of the sensors by a microprocessor to evaluate the weight distribution and determine the type of occupant and the facing direction of an infant seat. The sensor arrangement and the algorithm successfully cover most cases of seat occupancy. It is desirable, however, to encompass every case of seat occupancy.

SUMMARY OF THE INVENTION

It is therefore an object of the invention to detect a comprehensive range of vehicle seat occupants including infant seats for a determination of whether an airbag deployment should be permitted. Another object in such a system is to determine whether an infant seat is facing the front or the rear. Another object is to include sensitivity to the possible seating positions of small children.

A SIR system, as is well known, has an acceleration sensor to detect an impending crash, a microprocessor to process the sensor signal and to decide whether to deploy an airbag, and a deployment unit fired by the microprocessor. An occupant detection system can determine if an occupant or infant seat is positioned in a way to not benefit from deployment, and then signaling the microprocessor whether to allow or inhibit deploying the airbag.

A dozen sensors, judicially located in the seat, can garner sufficient pressure and distribution information to allow determination of the occupant type and infant seat position. This information, in turn, can be used as desired to inhibit SIR deployment. The sensors are arranged symmetrically about the seat centerline and includes a front pair, a right pair, a rear pair, a left pair and four in the center. Each sensor is a very thin resistive device, having lower resistance as pressure increases. A microprocessor is programmed to sample each sensor, determine a total weight parameter by summing the pressures, and determine the pattern of pressure distribution by evaluating local groups of sensors.

Total force is sufficient for proper detection of adults in the seat, but the pattern recognition provides improved detection of small children and infant seats. To detect infant seats, all patterns of sensor loading which correspond to the imprints of various seats are stored in a table and the detected sensor pattern is compared to the table entries. Front and rear facing seats are discriminated on the basis of total force and the loading of sensors in the front of the seat.

The pattern recognition for detecting children is made possible by applying fuzzy logic concepts to the pressure readings for each sensor in the array and assigning a load rating to each sensor. Pattern recognition is also enhanced by sampling several pairs of sensors, applying leveling technique to them, and computing a measure for the area of the seat covered by each pair. For all measures calculated within the algorithm, a contribution is made to an overall fuzzy rating which is used to handle marginal cases.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
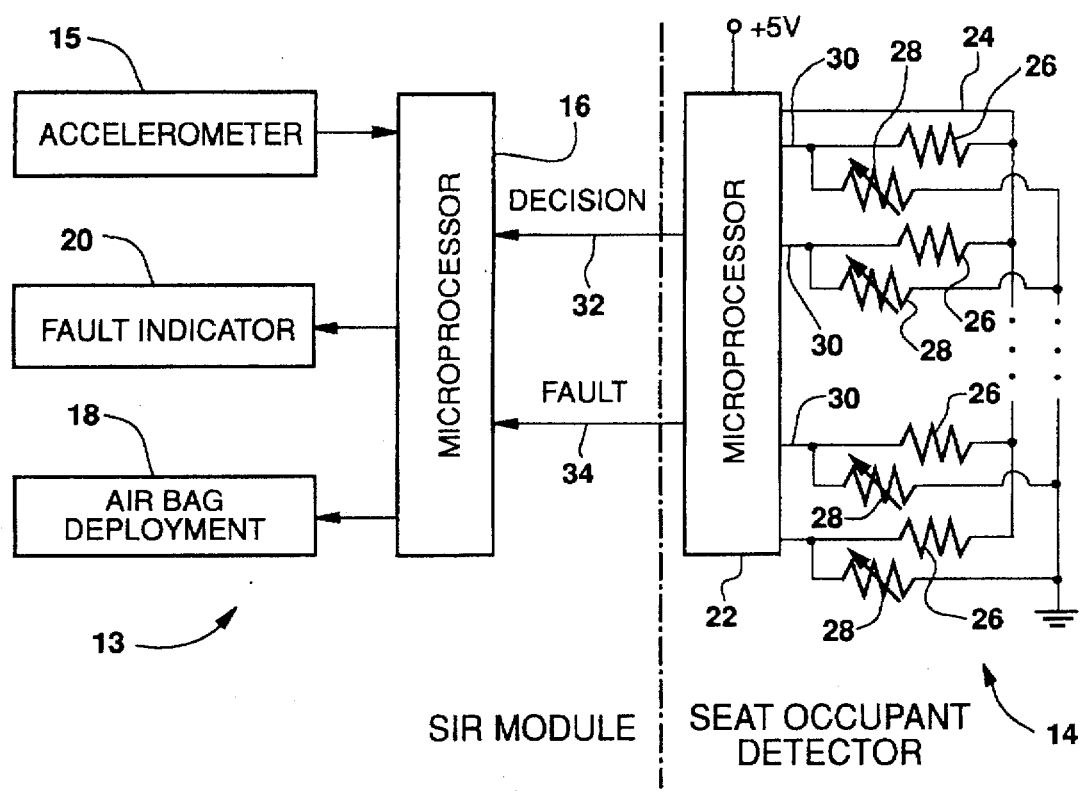
FIG. 1 is a schematic diagram of an SIR system incorporating a seat occupant detector.

Referring to FIG. 1, a SIR system includes a SIR module 13 coupled to a seat occupant sensing system 14. The SIR module 13 includes an accelerometer 15 mounted on the vehicle body for sensing an impending crash, a microprocessor 16 for receiving a signal from the accelerometer and for deciding whether to deploy an airbag. An airbag deployment unit 18 is controlled by the microprocessor 16 and fires a pyrotechnic or compressed gas device to inflate an airbag when a deploy command is received. A fault indicator 20, also controlled by the microprocessor 16 will show a failure of the seat occupant sensing system 14.

The seat occupant sensing system 14 comprises a microprocessor 22 having a 5 volt supply and an enabling line 24 periodically provided with a 5 volt enabling pulse, and a series of voltage dividers coupled between the enabling line 24 and ground. Each voltage divider has a fixed resistor 26 in series with a pressure sensor or variable resistor 28, and the junction point of each resistor 26 and variable resistor 28 is connected to an A/D port 30 of the microprocessor 22. The microprocessor 22 controls the pulse on enabling line 24 and reads each sensor 28 voltage during the pulse period. The microprocessor 22 analyzes the sensor inputs and issues a decision whether to inhibit airbag deployment and the decision is coupled to the microprocessor 16 by a line 32. The microprocessor 22 also monitors its decisions for consistency and issues a fault signal on line 34 to the microprocessor 16 if faults continue to occur over a long period.

Each fixed resistor 26 is, for example, 10 kohms and the variable resistors vary between 10 kohms at high pressure and 100 kohms at low pressure. Then the voltage applied to the ports 30 will vary with pressure. Each sensor comprises two polyester sheets each having a film of resistive ink connected to a conductive electrode, the two resistive films contacting one another such that the resistance between electrodes decreases as pressure increases. Such pressure sensors are available as ALPS pressure sensors from Alps Electric Co, Ltd, Tokyo, Japan.

Figure 2:
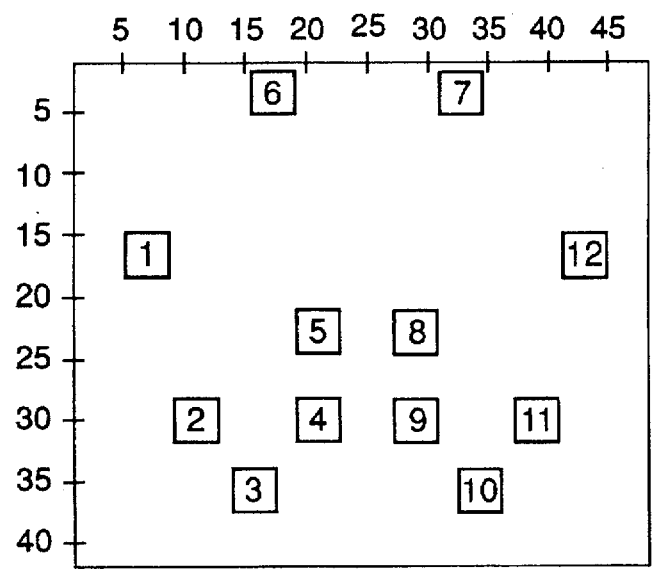
FIG. 2 is a position diagram of seat sensors for the system of FIG. 1, according to the invention.

The mounting arrangement of sensors 28 on a bottom bucket seat cushion is shown in FIG. 2. The sensors are numbered 1–12 according to seat location. A left pair of sensors 1 and 2 are on the left side of the seat with sensor 2 to the rear and slightly inboard of sensor 1. Sensors 11 and 12 are the corresponding right pair of sensors. A front pair of sensors 6 and 7 are at the front of the seat and a rear pair of sensors 3 and 10 are at the rear. The four remaining sensors 4, 5, 8 and 9 are the center group of sensors. Sensors 5 and 8 are astride the seat centerline and are just in front of sensors 4 and 9. The center group is positioned just to the rear of the seat middle.

Figure 3:
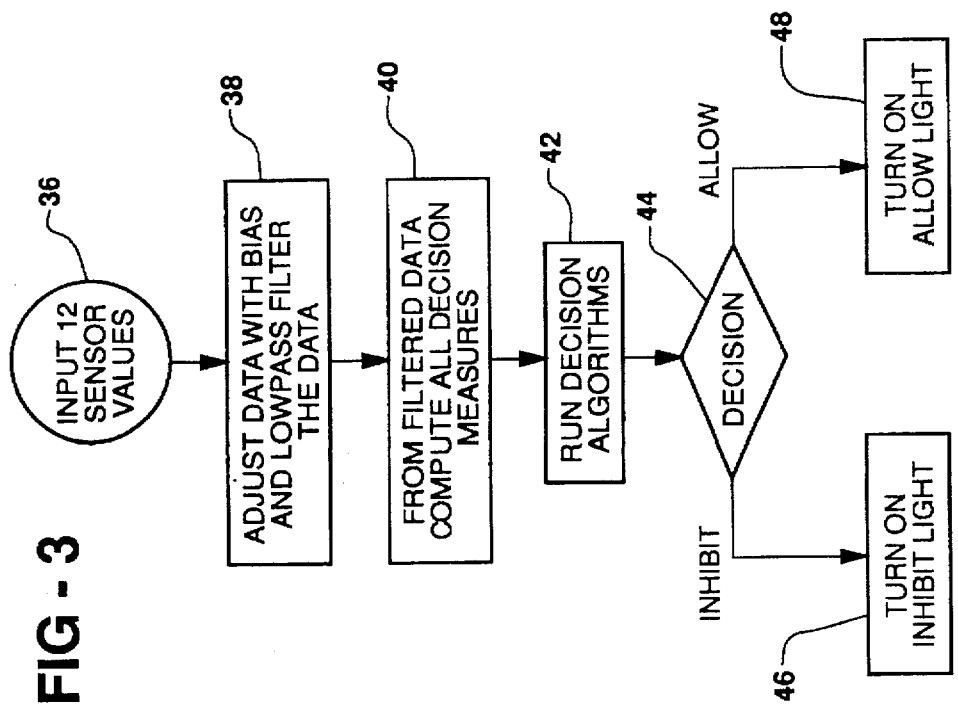
FIG. 3 is a flow chart representing an overview of an algorithm for determining deployment permission according to the invention.

The method of operation is illustrated by a series of flowcharts wherein the functional description of each block in the chart is accompanied by a number in angle brackets <nn> which corresponds to the reference number of the block. The overall operation is shown in FIG. 3 wherein the sensor values are read by the microprocessor 22 <36> and the data is adjusted by bias correction and low pass filtering <38>. One sensor at a time is turned on, sampled four times and averaged. Then a bias calibrated for each sensor is subtracted from each sensor reading, and the data is filtered with a time constant on the order of 1 second. Then all decision measures are computed <40> and decision algorithms are run <42>. Ultimately a decision is made to allow or inhibit airbag deployment <44>. Then either an inhibit light is turned on <46> or an allow light is turned on <48>.

Figure 4:
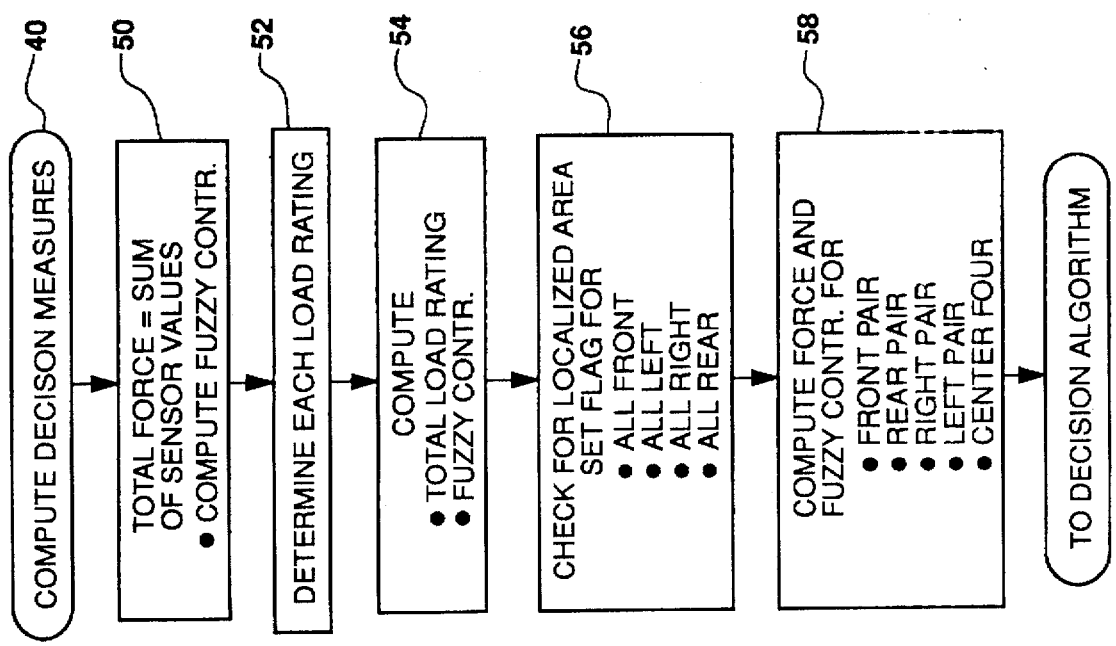
FIG. 4 is a flow chart representing a method of computing decision measures used in the algorithm of FIG. 3.
Figure 5:
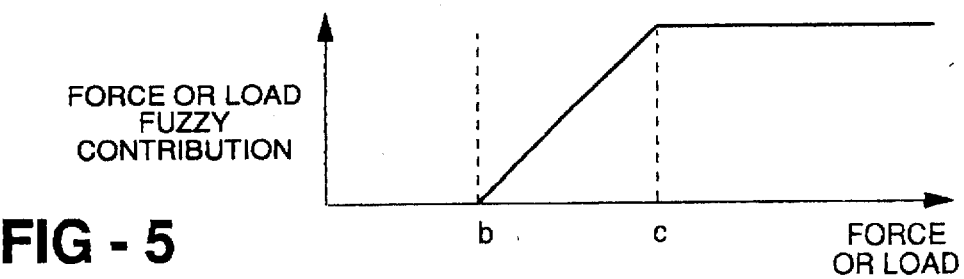
FIG. 5 is a graphical representation of a function used in fuzzy logic for total force and load ratings.

FIG. 4 shows the algorithm for computing decision measures 40. Total force is calculated by summing the sensor values and a fuzzy contribution is calculated for the total force <50>. Each sensor produces a voltage which is expressed as a digital value in the range of 0–255. The typical range is on the order of 0–50, however. An empty seat will have a total force near 0 after the bias adjustments. A fully loaded seat could go up to about 3000 but 2000 is more likely. For discrimination purposes, the inhibit/allow threshold is less then 255 and for reporting to the display software, the value is clipped to 255. The total fuzzy contribution is determined according to the function shown in FIG. 5. If the total force is below a minimum or inhibit threshold b, the fuzzy value is zero; if it is above a maximum or allow threshold, the fuzzy value is the difference between the inhibit and allow thresholds; and if it is between the thresholds the fuzzy value is equal to the force value minus the inhibit threshold. The thresholds are calibrated for each application; they may be for example, an inhibit threshold of 32 and an allow threshold of 128.

Figure 6:
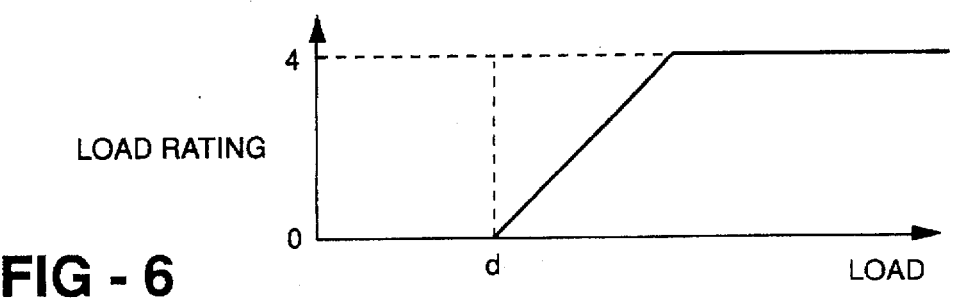
FIG. 6 is a graphical representation of a function used in fuzzy logic for determining load rating.

The next step in FIG. 4 is to determine the load rating of each sensor <52>. The load rating is a measure of whether the sensor is detecting some load and is used for pattern recognition purposes. Low loads present a borderline case which is rated by fuzzy logic according to a function similar to that of FIG. 5. As shown in FIG. 6, if a load is below a base value d, which may be four, the rating is zero and if it is above the base value it is the difference between the base and the measured load up to a limit value of, say, four. The total load rating is calculated <54> by summing the individual sensor ratings and the fuzzy contribution of the total load rating is again determined as in FIG. 5 where a total load below a minimum threshold b is zero, a total load above the minimum is the total load minus the minimum threshold up to a limit at maximum threshold c. The minimum threshold may be four, for example, and the maximum threshold may be 24.

Figure 7:
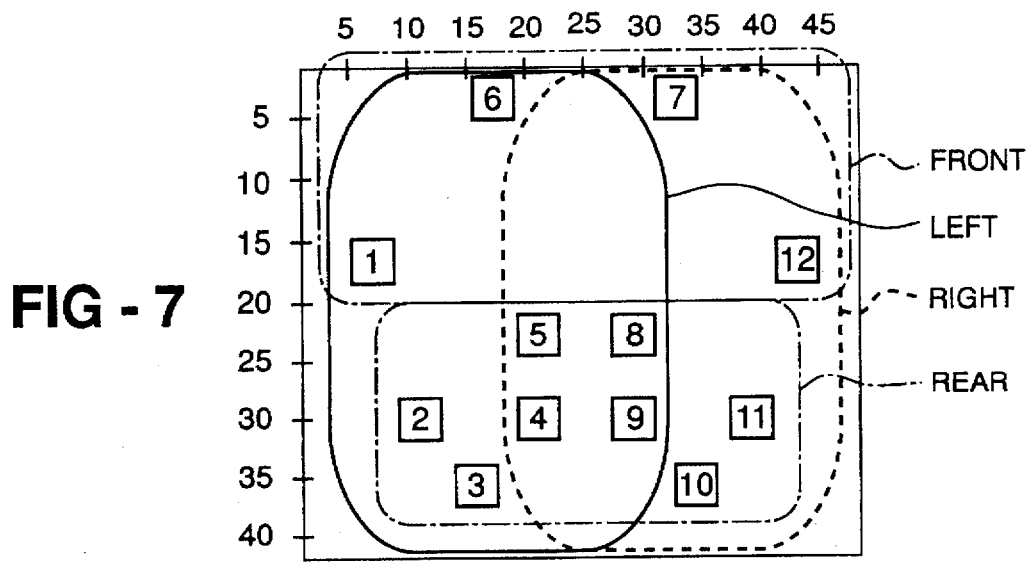
FIG. 7 is a position diagram of seat sensors illustrating sensor grouping.

Next a check is made for force concentration in a localized area <56>. Four overlapping localized areas are defined as shown in FIG. 7. The front four sensors 1, 6, 7 and 12 are in the front group, the rear eight sensors 2, 3, 4, 5, 8, 9, 10 and 11 are in the rear group, the left eight sensors 1, 2, 3, 4, 5, 6, 8, and 9 are in the left group, and the eight sensors 4, 5, 7, 8, 9, 10, 11, and 12 are in the right group. The algorithm determines if the pressure is all concentrated in one group by summing the load ratings of the sensors in each group and comparing to the total load rating. If the rating sum of any group is equal to the total rating, a flag is set for that group (all right, all front etc.).

Finally the force and fuzzy contribution is computed for each pair of sensors and for the center group <58>. The force on each pair is used to detect occupants such as small children which can easily sit in one small area of the seat. These measures are looking for the pressure to be evenly distributed over the two sensors of the pair. To accomplish this the algorithm looks at each pair, determines the minimum value of the two sensors, and clip the higher one to a calibrated "delta" from the lower. If the force is evenly distributed over the two sensors the values will be about equal and the sum will be unaffected by clipping. The sum of the two sensor forces, as adjusted, comprise the force measure of the pair. The fuzzy contribution of each pair is equal to the force measure of the pair but limited to a maximum value such as 20 which is calibrated separately for each pair. The center group measure is the sum of the sensor forces and the fuzzy contribution is equal to the sum of the four sensors but limited to a calibrated maximum value.

| Pattern | 1 | 2 | 3 | 4 | 5 | 6 | 7 | 8 | 9 | 10 | 11 | 12 |
|---|---|---|---|---|---|---|---|---|---|---|---|---|
| | | | | | | SENSOR | | | | | | |
| 1 | | L | L | U | U | L | L | U | U | L | L | |
| 2 | L | | | U | U | | | U | U | | | L |
| 3 | L | | | U | U | U | L | U | U | | | |
| 4 | | | | L | L | L | U | L | L | | | L |
| 5 | | L | | U | U | | | U | U | | L | |
| 6 | | U | L | U | U | L | | U | U | | | |
| 7 | | | | U | U | | L | U | U | L | U | |
| 8 | L | | | U | U | L | L | U | U | | | L |
| 9 | LX | L | | U | U | | | LX | L | | | |
| 10 | | | | LX | L | | | U | U | | LX | L |
| 11 | L | | | | L | | | L | | | | L |
| 12 | | L | | U | | | | | | U | L | |

Figure 9:
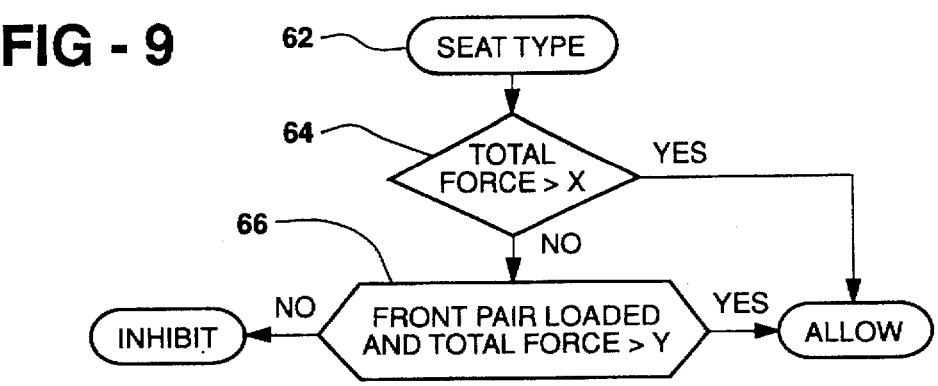
FIG. 9 is a flow chart representing the logic for determining the facing direction of an infant seat as required by the algorithm of FIG. 8.
Figure 8:
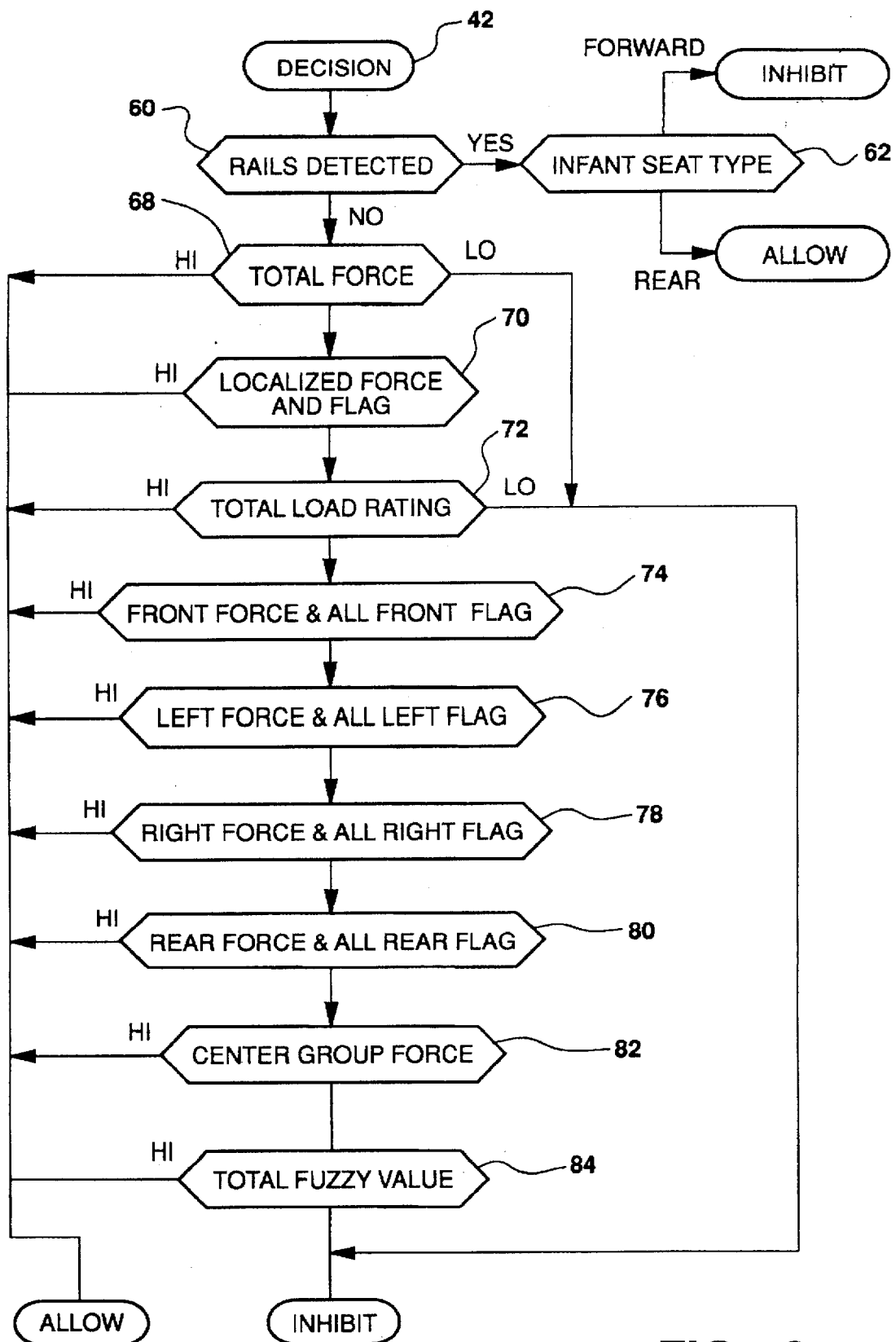
FIG. 8 is a flow chart for deployment decision, according to the invention.

The measured values, ratings, patterns and flags are used in deciding whether to allow or inhibit deployment. As shown in FIG. 8, the decision algorithm 42 first decides if rails of an infant seat are detected <60> and if so whether the seat is facing forwardly or rearwardly <62>. Deployment is allowed for a forward facing seat and inhibited for a rear facing seat. This is determined as shown in FIG. 9 wherein if the total force is greater than a certain value <64> the seat is forward facing and deployment is allowed. If not, and the front pair of sensors is loaded and the total force is greater than another set value <66>, the seat is forward facing and deployment is allowed. Otherwise the seat is rear facing and deployment is inhibited. It should be noted that whenever an inhibit or allow decision is made, that decision is controlling and all other conditions lower on the chart are bypassed.

If rails are not detected <60>, the total force is compared to high and low thresholds <68>. If it is above the high threshold deployment is allowed and if below the low threshold the deployment is inhibited. Otherwise, if the localized force for a sensor group is above a threshold and the flag corresponding to that group is set <70>, deployment is allowed. If not, the next step is to compare the total load rating to high and low thresholds <72>. Deployment is allowed if the rating is above the high threshold and inhibited if below the low threshold. Each of the sensor pairs for front, left, right, and rear are compared to threshold values <74–80>. If any of them are above its allowed. If not, the center group force is compared to a threshold <82> to decide upon allowance. Finally, the total fuzzy value is compared to a threshold <84> to allow deployment if it is sufficiently high, and if not the deployment is inhibited. The fuzzy value decision manages a marginal case where several of the previous measures came close to exceeding their thresholds but didn't, the fuzzy measure can still allow deployment.

It will thus be seen that airbag deployment can be allowed or inhibited by a pattern of resistive sensors embedded in a seat cushion and coupled to a microprocessor to detect the force on each sensor to determine the loading pattern as well as the force values from which infant seat presence and orientation are determined as well as the presence of other occupants.

The embodiments of the invention in which an exclusive property or privilege is claimed are defined as follows:

1. A method of airbag control in a vehicle having an array of force sensors on the passenger seat coupled to a controller for determining whether to allow airbag deployment based on sensed force and force distribution comprising the steps of:

measuring the force detected by each sensor;

calculating the total force of the sensor array;

allowing deployment if the total force is above a total threshold force;

defining a plurality of seat areas, at least one sensor located in each seat area;

determining the existence of a local pressure area when the calculated total force is concentrated in one of said seat areas;

calculating a local force as the sum of forces sensed by each sensor located in the seat area in which the total force is concentrated; and allowing deployment if the local force is greater than a predefined seat area threshold force.

2. The method of airbag control as defined in claim 1 including:

determining a pattern of sensor loading;

determining from the pattern of sensor loading whether an infant seat is on the passenger seat;

then determining from the total force and force distribution whether the infant seat is facing forward or rearward;

allowing deployment for a forward facing seat; and inhibiting deployment for a rearward facing seat.

3. The method of airbag control as defined in claim 2 wherein the step of determining a pattern of sensor loading comprises detecting which sensors are below a first load threshold and which sensors are above a second load threshold.

4. The method of airbag control as defined in claim 2 wherein the step of determining from the pattern of loaded sensors whether an infant seat is present comprises:

establishing a table of loaded and unloaded sensor patterns which result from the configuration of the bottom of an infant seat; and deciding that an infant seat is present when the pattern of sensor loading matches one of the table patterns.

5. The method of airbag control as defined in claim 2 wherein the step of determining whether the infant seat is facing forward or rearward comprises:

deciding that the seat is facing forward when
1) the total force is greater than a first value, or
2) sensors in the front of the seat are loaded and the total force is greater than a second value; and deciding that the seat is facing rearward when both the conditions 1) and 2) are not true.

6. The method of airbag control as defined in claim 1 including:

determining a pattern of sensor loading;

prior to the step of allowing deployment if the total force is above a total threshold force, determining from the pattern of sensor loading whether an infant seat is on the seat;

then determining from the total force and force distribution whether the infant seat is facing forward or rearward;

allowing deployment for a forward facing seat; and inhibiting deployment for a rearward facing seat.

7. The method of airbag control as defined in claim 1 wherein the defined seat areas overlap so that some sensors are included in more than one seat area, the seat areas including a front area, a rear area, a right area and a left area.

8. The method of airbag control as defined in claim 1 wherein each of said seat areas includes a secondary group of sensors peculiar to that seat area and the method includes:

calculating a modified local force for each secondary group located in a seat area in which the total force is concentrated; and allowing deployment if the modified local force for exceeds a threshold for that secondary group.

9. The method of airbag control as defined in claim 8 wherein each secondary group of sensors comprises a pair and the step of calculating a modified local force comprises limiting the higher sensor force to a maximum delta above the lower sensor force and adding the higher sensor force, as limited, to the lower sensor force.

10. The method of airbag control as defined in claim 1 including the steps of:

defining a center seat area including a group of sensors located in the center of the passenger seat, calculating a local force for the center seat area as the sum of the forces sensed by the sensors in the center seat area; and allowing deployment if the local force for the center seat area is greater than a predefined center seat area threshold force.

11. A method of airbag control in a vehicle having an array of force sensors on the passenger seat coupled to a controller for determining whether to allow airbag deployment based on sensed force and force distribution comprising the steps of:

measuring the force sensed by each sensor;

calculating the total force of the sensor array;

allowing deployment if the total force is above a total threshold force;

assigning a load rating to each sensor based on its measured force, said load ratings being limited to maximum value;

summing the assigned load ratings for all the sensors to derive a total load rating; and allowing deployment if the total load rating is above a predefined total load threshold, whereby deployment is allowed if the sensed forces are distributed over the passenger seat, even if the total force is less than the total threshold force.

12. The method of airbag control as defined in claim 11 wherein the step of assigning a load rating to each sensor comprises:

establishing a base force; and assigning a load rating according to the measured force minus the base force.

13. The method of airbag control as defined in claim 11 further including the steps of:

defining a plurality of seat areas, at least one sensor located in each seat area;

determining the existence of a local pressure area when the calculated total force is concentrated in one of said seat areas;

calculating a local force as the sum of forces sensed by each sensor located in the seat area in which the total force is concentrated; and allowing deployment if the local force is greater than a predefined seat area threshold force.

14. The method of airbag control as defined in claim 13 further including the steps of:

determining individual fuzzy values based on the total force, the local forces for each seat area, and total load rating;

summing said fuzzy values; and allowing deployment if the summed fuzzy values exceed a threshold.

15. A method of airbag control as set forth in claim 11, including the steps of:

determining a fuzzy total force contribution value based on the calculated total force;

determining a fuzzy total loading contribution value based on the total load rating; and summing the fuzzy total force and fuzzy total loading contribution values, and allowing deployment if the summed contribution values exceed a predefined fuzzy threshold.

16. The method of airbag control as defined in claim 15 wherein the steps of determining the fuzzy total force and total loading contribution values comprises:

setting minimum and maximum thresholds for the total force and total load rating; and subtracting the minimum thresholds from the respective total force and total load rating, and limiting each difference to the respective maximum threshold; and determining the fuzzy total and total loading contribution values based on the respective limited differences.

17. A method of airbag control in a vehicle having an array of force sensors on the passenger seat coupled to a controller for determining whether to allow airbag deployment based on sensed force and force distribution comprising the steps of:

measuring the force sensed by each sensor;

calculating the total force of the sensor array;

allowing deployment if the total force is above a total threshold force; and if the total force is not above the total threshold force, determining a fuzzy total force contribution value based on the calculated total force;

defining a plurality of seat areas, at least one sensor located in each seat area, calculating a local force for each seat area as the sum of forces sensed by each sensor located in that seat area, and determining a fuzzy local force contribution value based on each of the calculated local forces; and summing the fuzzy total force and fuzzy local force contribution values, and allowing deployment if the summed contribution values exceed a predefined fuzzy threshold.

18. The method of airbag control as defined in claim 17 wherein the steps of determining the fuzzy total and local force contribution values comprises:

setting a minimum and maximum force threshold for each total and local force; and subtracting the minimum force thresholds from the respective total and local forces and limiting each difference to the respective maximum force threshold; and determining the fuzzy total and local force contribution values based on the respective limited differences.

19. The method of airbag control as defined in claim 17 wherein a pair of sensors are located in each seat area, and wherein:

the step of calculating the local force for each seat area comprises the steps of:

limiting the higher force of the respective pair of sensors to a set amount greater than the lower force of the respective pair of sensors, and summing the lower force and the higher force, as limited, to derive the local force;

and the step of determining a fuzzy local force contribution amount comprises the steps of:

setting a maximum pair force threshold, and setting the fuzzy local force contribution amount equal to the local force limited to the maximum pair force threshold.

* * * * *

(12) EX PARTE REEXAMINATION CERTIFICATE (10672nd)
United States Patent
Cashler

(10) Number: US 5,732,375 C1
(45) Certificate Issued: Jul. 30, 2015

(54) METHOD OF INHIBITING OR ALLOWING AIRBAG DEPLOYMENT

(75) Inventor: Robert John Cashler, Kokomo, IN (US)

(73) Assignee: SIGNAL IP, INC., Los Angeles, CA (US)

Reexamination Request:
No. 90/013,386, Oct. 27, 2014

Reexamination Certificate for:
Patent No.: 5,732,375
Issued: Mar. 24, 1998
Appl. No.: 08/566,029
Filed: Dec. 1, 1995

(51) Int. Cl.
*B60R 21/01* (2006.01)
*G06K 9/00* (2006.01)
*G06K 9/32* (2006.01)
*B60R 21/015* (2006.01)

(52) U.S. Cl.
CPC ...... *G06K 9/00362* (2013.01); *B60R 21/01516* (2014.10); *G06K 9/3241* (2013.01)

(58) Field of Classification Search
None
See application file for complete search history.

(56) References Cited

To view the complete listing of prior art documents cited during the proceeding for Reexamination Control Number 90/013,386, please refer to the USPTO's public Patent Application Information Retrieval (PAIR) system under the Display References tab.

*Primary Examiner* — Jalatee Worjloh

(57) ABSTRACT

An array of pressure sensors on a vehicle passenger seat senses the presence of an occupant including an infant seat and determines whether the infant seat faces forward or rearward. A microprocessor coupled to the sensors determines whether to allow or inhibit deployment based on the sensor load forces and the pattern of loading. The pattern can identify an infant seat and pattern and loading determine its orientation. Local areas are checked to detect child occupants. Fuzzy logic is used to determine loading and to recognize patterns.

Attention is directed to the decision of *Signal IP, Inc. v. BMW of North America, LLC et al.*, 2:14cv03111-JAK (JEMx) (USDC Central District of CA) in which claims 1 and 7 of U.S. Pat. No. 5,732,375 were held to be invalid under 35 USC 112, 2nd. This reexamination may not have resolved all questions raised by this decision. See 37 CFR 1.552(c) for *ex parte* reexamination and 37 CFR 1.906(c) for *inter partes* reexamination.

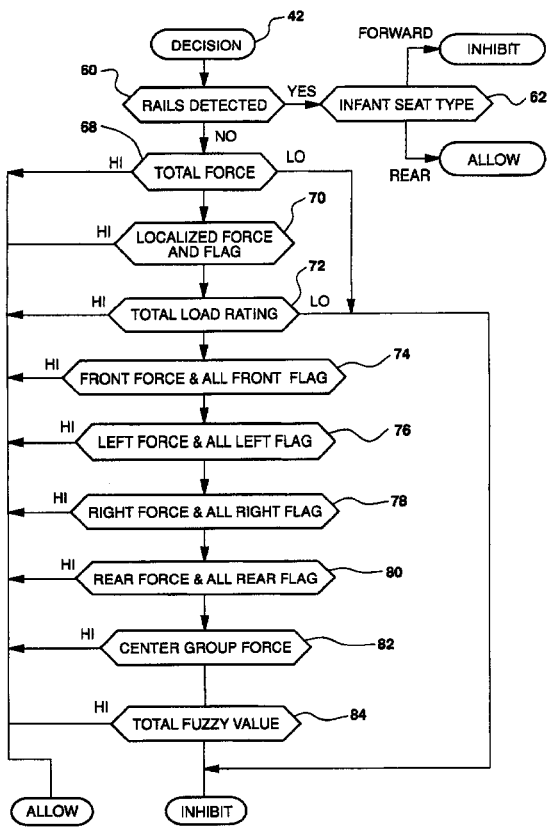

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1 and 7 is confirmed.

Claims 2-6 and 8-19 were not reexamined.

\* \* \* \* \*